L. J. HOUPT.
TRANSMISSION AND REVERSING GEARING FOR ENGINES.
APPLICATION FILED FEB. 26, 1913.

1,091,338.

Patented Mar. 24, 1914.

WITNESSES:
Hubert J. Jacob.
A. J. Hind.

INVENTOR.
L. J. HOUPT
BY Watson E. Coleman
ATTORNEY.

UNITED STATES PATENT OFFICE.

LESTER J. HOUPT, OF BLENCOE, IOWA.

TRANSMISSION AND REVERSING GEARING FOR ENGINES.

1,091,338.  Specification of Letters Patent.  Patented Mar. 24, 1914.

Application filed February 26, 1913. Serial No. 750,928.

*To all whom it may concern:*

Be it known that I, LESTER J. HOUPT, a citizen of the United States, residing at Blencoe, in the county of Monona and State of Iowa, have invented certain new and useful Improvements in Transmission and Reversing Gearing for Engines, of which the following is a specification, reference being had to the accompanying drawings.

This invention relates to new and useful improvements in transmission and reversing gearing for engines and has for its object to provide an improved device of this character which is simpler and more efficient than similar devices for the same purpose now in use.

A further object of the invention resides in providing a device in which the driven and driving shafts are provided with oppositely disposed cone pulleys which are connected by means of an endless belt or the like and a further object resides in providing means for the disposition of the pulley on the driven shaft nearer to and away from the pulley on the driving shaft.

A still further object of the invention resides in providing means for the operation of the endless belt on the cone pulleys and a still further object resides in providing a device which is inexpensive to manufacture and one which will be very efficient and useful in operation.

With these and other objects in view, the invention consists in the novel features of construction, combination and arrangement of parts as will be hereinafter referred to and more particularly pointed out in the specification and claims.

Figure 1:
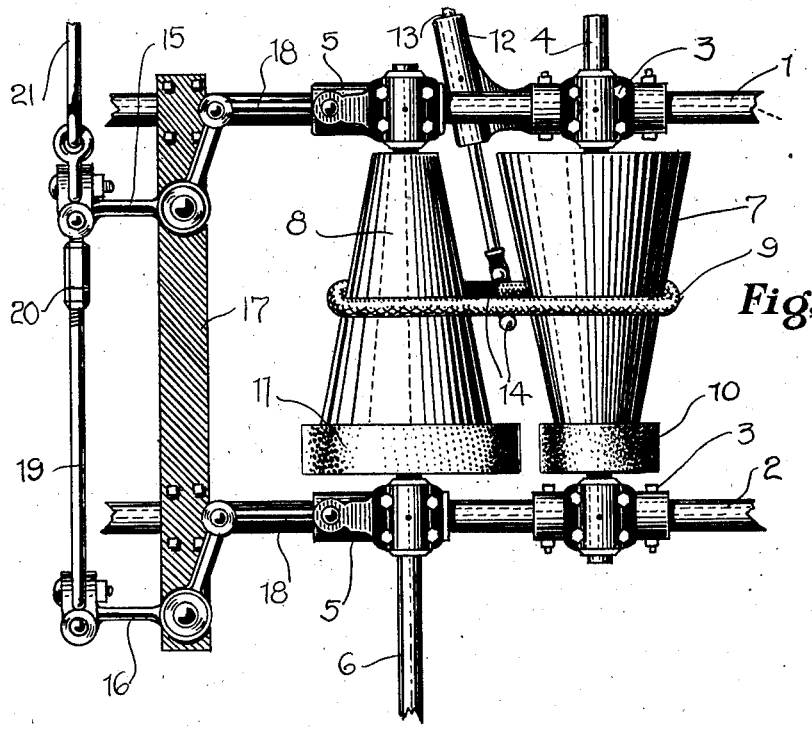
Figure 2:
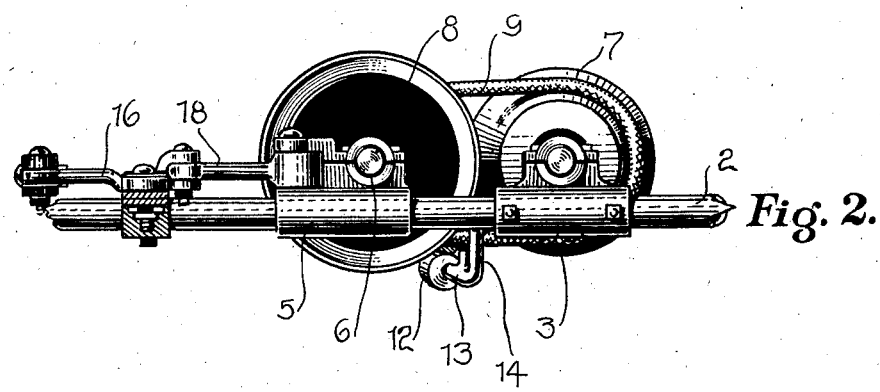

In the accompanying drawing forming a part of this application, Figure 1 is a plan view of the gearing with parts in section; and Fig. 2 is an end elevation thereof.

In describing my invention, I shall refer to the drawing in which similar reference characters designate corresponding parts throughout the several views and in which—

1 and 2 indicate respectively a pair of parallel transverse shafts spaced one from the other and disposed in the same horizontal plane and securely mounted on said shafts are the bearings 3 in which is rotatably mounted a driving shaft 4 which leads to an engine (not shown). Slidably mounted on each of the shafts 1 and 2, to one side of the bearings 3, are additional bearings 5, said latter bearings rotatably supporting therein, a driven shaft 6. Mounted on said shafts 4 and 6, between the respective bearings in which they are mounted, are the cone pulleys 7 and 8 respectively, said pulleys being disposed in opposite directions, that is, having the flaring ends thereof opposed to one another. Extending over these cone pulleys 7 and 8, is an endless belt or band 9 which, when drawn taut, will cause one pulley to be rotated upon the rotation of the other and the smaller end of the pulley 7 is provided with a friction head 10, while the adjacent larger end of the opposite pulley 8 is provided with a similar and larger head 11. This endless band or belt 9 engaging the cone pulleys 7 and 8, is adapted to be moved longitudinally of said pulleys for the purpose of changing speeds and in order to operate the same, a bearing 12 is formed on the bearing 3 which is carried on the shaft 1, the same being disposed in a plane below the latter. This bearing has the axis thereof disposed in a plane parallel to the planes of the inner sides of the cone pulleys 7 and 8, and slidably disposed therethrough is a shifting rod 13, the inner end of which is provided with a pair of laterally extending and spaced apart arms 14. These arms receive therein a reach of the endless band or belt 9 and it is obvious that when said rod 13 is shifted in one direction or the other, the belt or band 9 will be moved longitudinally on said pulleys. This shifting rod 13 extends forwardly and connects with any desired form of operating means (not shown).

As stated, the driven shaft 6 is rotatably mounted in sliding bearings 5 and it will thus be seen that the pulley 8 may be moved nearer the pulley 7 so that the friction heads 10 and 11 may be actually engaged with one another to cause said heads to be driven thereon from the pulley 7. This, however, is for the purpose of reversing the rotation of the driven shaft 6 which is obviously caused by the frictional contact of the heads 10 and 11. In order to move the driven shaft and correspondingly the pulley 8, with respect to the belt 9, a pair of bell crank levers 15 and 16 are provided, the same being fulcrumed on the frame 17 which supports the shafts 1 and 2, the fulcrum points of said levers being respectively disposed in the rear of the vertical planes of said shafts 1 and 2. The one arm of each of said bell crank levers has pivotal connection through the medium of a linking arm 18 with the adjacent sliding bearing 5, while the opposite arm of each of said bell crank levers has pivotal connection with the end of a longitudinally disposed linking arm 19. This latter arm is capable of longitudinal adjustment through the adjusting mechanism 20 and is linked into engagement with the operating rod 21, the latter extending to any desired form of manual operating means (not shown). Through this medium, it will be seen that when the linking arm 19 is drawn forwardly, the sliding bearings 5 will be disposed toward the bearings 3 to slacken the endless band or belt 9 and cause the heads 10 and 11 to be frictionally engaged with one another, whereby the shaft 6 is driven in a reverse direction to that of the drive shaft 4. A disposition of the linking arm 19 in a rearward direction will, obviously, draw the bearings 5 away from the bearings 3 to disengage the friction heads 10 and 11 and draw the endless band 9 taut, thereby causing the pulley 8 and correspondingly the shaft 6 to be rotated in the same direction as the shaft and pulley 4 and 7. This endless band may then be disposed longitudinally to any desired position on the pulleys to accordingly change the speed of the driven shaft.

From the foregoing description of the construction of my improved device, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a device of the class described, the combination with a support, and a pair of parallel spaced apart supporting shafts; of a pair of bearings rigidly secured to said shafts in alinement with one another, a drive shaft rotatably mounted in said bearings, an additional pair of bearings slidably mounted on said shafts, a driven shaft rotatably mounted in said last mentioned bearings, oppositely disposed cone pulleys carried on said drive and driven shafts between the pairs of bearings, means in connection with said sliding bearings for moving the same on said supporting shafts to correspondingly remove the one pulley laterally with respect to the other, friction means on each of said pulleys adapted for engagement with one another to cause one pulley to be rotated upon the rotation of the other, an endless flexible connection disposed over said pulleys to cause one of the latter to be rotated upon the rotation of the other when the same are spaced from one another, and means for moving said endless connection longitudinally on the pulleys.

2. In a device of the class described, the combination with a pair of spaced apart parallel shafts; of a driving shaft rotatably supported on the aforesaid shafts, a driven shaft also rotatably supported on said parallel shafts and capable of movement thereon with respect to the driving shaft, a pair of oppositely disposed cone pulleys carried on said drive and driven shafts between said supporting shafts, an endless flexible connection disposed over said pulleys to cause one to be rotated from the other, means for slidably moving said driven shaft and cone thereon on said supporting shafts, a bearing formed on one of said supporting shafts, a shifting rod slidably disposed therethrough, and means on the end of said shifting rod engaged with said endless flexible connection to dispose the same in various positions on the pulleys, as the shifting rod is operated.

In testimony whereof I hereunto affix my signature in the presence of two witnesses.

LESTER J. HOUPT.

Witnesses:
J. H. HOUPT,
A. O. GRAY.